United States Patent [19]

Mears et al.

[11] Patent Number: 4,539,706
[45] Date of Patent: Sep. 3, 1985

[54] MOBILE VEHICULAR REPEATER SYSTEM WHICH PROVIDES UP-LINK ACKNOWLEDGEMENT SIGNAL TO PORTABLE TRANSCEIVER AT END OF TRANSCEIVER TRANSMISSION

[75] Inventors: David F. Mears; Hubert A. Patterson, both of Lynchburg, Va.

[73] Assignee: General Electric Company, Lynchburg, Va.

[21] Appl. No.: 463,587

[22] Filed: Feb. 3, 1983

[51] Int. Cl.³ .............................................. H04B 7/15
[52] U.S. Cl. ........................................ 455/11; 455/15; 455/54; 455/58
[58] Field of Search ................... 455/7, 11, 15, 17, 20, 455/54, 56, 58; 340/313, 825.5; 370/85

[56] References Cited

U.S. PATENT DOCUMENTS

| | | | |
|---|---|---|---|
| 3,678,391 | 7/1972 | Gough | 455/54 |
| 3,955,140 | 5/1976 | Stephens et al. | 455/58 |
| 3,989,119 | 10/1976 | Hemmer, Jr. et al. | 455/54 |
| 4,012,597 | 3/1977 | Lynk, Jr. et al. | 455/54 |
| 4,056,779 | 11/1977 | Toler | 455/58 |
| 4,162,449 | 7/1979 | Bouyssounouse et al. | 455/18 |

*Primary Examiner*—Jin F. Ng
*Attorney, Agent, or Firm*—Cushman, Darby & Cushman

[57] ABSTRACT

A mobile vehicular repeater detects the termination of a received transmission from a portable transceiver to be repeated and, in response to such detection, activates the up-link radio transmitter so as to send an acknowledgement signal to the message originating portable transceiver station signifying the probable successful conclusion of a repeating operation. Special techniques are utilized to prevent confusion between such an acknowledgement signal and similar prioritizing transmissions on the up-link frequency.

14 Claims, 7 Drawing Figures

MOBILE VEHICULAR REPEATER SYSTEM WHICH PROVIDES UP-LINK ACKNOWLEDGEMENT SIGNAL TO PORTABLE TRANSCEIVER AT END OF TRANSCEIVER TRANSMISSION

This invention is directed to a mobile vehicular radio repeater and to radio communication systems utilizing such repeaters. It is particularly applicable to a radio repeater system having plural portable transceivers capable of communication on a first frequency channel F1 with plural mobile repeaters (one of which assumes priority status to actually perform repeating operations) which repeater is, in turn, capable of transceive operations on another frequency channel F2, or deuplex channel (i.e. F2 TX-F3 RX) with a fixed base transceiver.

Numerous types of radio repeaters and types of systems using such repeaters are well known in the prior art. One type of prior art repeater system involves mobile vehicular repeaters (e.g. located in police cars, fire department vehicles, etc.) which are utilized to repeat communications on one channel frequency F1 from relatively low powered portable transceivers (e.g. personal hand held units employed by policemen, firemen, etc. when on foot or otherwise out of the vehicle) to a fixed base or other transceiver operating on another frequency channel F2 (e.g. the central police station, fire department, etc.). So as to avoid interference between competing repeaters, various prioritizing schemes have been utilized in an attempt to insure that only one of the repeaters at any given time is in a "priority" status and thus actually operative. If that repeater should for some reason become inoperative, leave the scene of the portable transceivers, etc., then provisions are typically made for another one of the available vehicular repeaters within range of the transceivers to automatically take on a "priority" status and to thereafter respond to desired repeating requests to the fixed base or other station. In some prior art arrangements, the prioritizing scheme involves the transmission of a burst of audio frequency modulated carrier signals on the portable to repeater frequency channel. These tones are typically generated when a portable unit is physically detached from an associated repeater unit or upon occurrence of other key events and utilized by repeaters to increment internal priority state determining circuits. To be effective, the duration of such a priority-determining tone signal must be more than a predetermined minimum.

One particular type of existing prioritizing scheme now being utilized by General Electric Systems (and utilized in the preferred embodiment of the present invention) is one where each vehicular repeater has only two priority states: (a) a "priority" state where it operates as an active repeater, and (b) a "non-priority" state where it monitors on-going repeating acivity but merely "stands-by" unless a request for a repeating operation is not timely responded to by another repeater, in which event, the repeater will assume "priority" status. In this sytem, whenever a portable transceiver is removed (or otherwise disassociated) from its vehicular repeater (e.g. when an officer picks up the portable unit and leaves his vehicle), that particular repeater typically automatically assumes a "priority" status and it also transmits a coded prioritizing signal (e.g. F1 carrier with T1 tone modulation) to all other repeaters within range. When such a prioritizing signal is received and detected at the other repeaters, they are reset to "non-priority" status—if not already residing in that status.

In such prior vehicular repeater systems, there has been no convenient way for the operator of the portable transceiver to determine if his transmission has been successfully repeated by the vehicular repeater. This lack of knowledge is especially serious where the portable transceiver operator's life may depend upon successful message transmission and when he is well aware of the fact that there are many different reasons that his transmission may not have been successfully repeated. For example, during the message transmission he may have inadvertently moved out of range of the vehicular repeater. The vehicular repeater itself may have been disabled. In a life threatening situation, the portable transceiver operator may have himself inadvertently turned off (or failed to turn on) his channel guard signal (e.g. a "CG" tone modulation on an F1 carrier which is typically required to distinguish an intended portable-to-portable communication on the F1 channel from one that is to be repeated by the repeater on channel F2). Accordingly, it is a decided comfort and advantage to the portable transceiver operator to receive some assuring acknowledgement at the conclusion of his transmission indicating that, in all probability, he has successfully maintained contact with the vehicular repeater and that the vehicular repeater has, in all probability, successfully re-transmitted his message on the appropriate channel (e.g. to the fixed base station).

Prior art repeater systems have used the transmission of audio frequency tone bursts for various types of signalling purposes. For example, some prior art systems of fixed repeaters may transmit an audio tone at the conclusion of a repeated transmission; however, so far as is known, such conclusion-of-repeating signals have only been transmitted on the repeater down-link frequency (i.e. to the recipient of the repeated message rather than to the originator on a different up-link frequency)—and usually after some time delay. One possible purpose of such a tone is to indicate to the recipient that it is now an appropriate time to initiate a return transmission via the repeater.

The prior art may have also used transmitted curtesy tone bursts so as to force a break in conversation between two parties via a repeater thus allowing a third party to gain access to the repeater channel. For example, at the end of a given transmission, the repeater may be disabled for a few seconds after which a short tone burst may be transmitted indicating that the repeater is once again enabled thus giving everyone an equal opportunity to next key the repeater.

In the prior art, tone bursts have also sometimes been transmitted at the end of each transmission so as to indicate the end of a transmission. For example, this is sometimes used in a noisy environment where it may be difficult to distinguish between the end of a message and a mere pause in the conversation. It is believed that NASA Space Communications Systems employ such a scheme and that it can be used in either a simplex or duplex system.

Other prior art systems use tone sequences to identify individual repeaters in a voting system, a variable frequency tone to indicate received signal strength at the repeater site and/or to indicate deviation in the received signal carrier frequency from the correct carrier frequency (so as to enable the remote keying transmitter to be adjusted), etc.

Prior art trunked repeating systems (e.g. see commonly assigned U.S. patent application Ser. No. 129,645 filed Mar. 12, 1980, now U.S. Pat. No. 4,360,927) utilize a "handshake" exchange of acknowledgement signals with a repeater at the initiation of a transmission to be repeated. In this way, successful capture of a repeater by a remote station is insured before the remote station is permitted to actually transmit the message to be repeated. So far as is known, no such prior art trunked repeater system has transmitted an acknowledgement signal to the originating station at the conclusion of a repeated transmission.

The present invention solves the previously described problem in a vehicular repeater system where one or more portable transceivers communicate with one or more mobile vehicular repeaters on channel F1 and where a priority status repeater in turn communicates with a fixed base station on another channel F2. In brief summary, the solution to this problem is achieved in accordance with the present invention by providing a control mechanism at the mobile vehicular repeater for detecting the termination of an intended portable-to-base transmission by a portable unit on F1 and, in response, then activating the up-link F1 radio transmitter of the repeater so as to send an acknowledgement signal back to the originating portable transceiver (and to all other transceivers within range on the up-link channel F1) signifying the probable successful conclusion of the repeating operation. This gives the operator of the portable transceiver a positive indication that the just concluded transmission was in all probability successfully repeated. In the preferred exemplary embodiment of this invention, the acknowledgement signal comprises an audio frequency tone T1 modulation of predetermined duration on the up-link channel F1. Such a short burst of audio tone is automatically detected as such and relayed to the operator of the portable transceiver (through the usual r.f. and audio detection circuits) as an audible "beep".

As previously described, similar audio frequency tone T1 modulated bursts have been utilized and are presently being utilized in some systems as part of a repeater prioritizing scheme. Accordingly, if similar tone bursts are to be utilized as the acknowledgement signal to the originating portable transceiver operator in accordance with this invention, then steps must be taken to insure that such acknowledgement signals are not inadvertently sensed as a prioritizing signal by other repeater stations within range. The use of a different audio frequency for the acknowledgement signal from that used for the prioritizing scheme would be one possible solution to this particular problem. However, that approach requires additional hardware and space in the repeaters that may not be available and, in any event which would represent additional costs, complexity, etc.

Accordingly, in the exemplary embodiment of this invention preferably within a vehicular repeater system having a prioritizing scheme like that of General Electric as explained above, the same audio frequency T1 is used for both acknowledgement signals and for prioritizing signals. However, the tone burst used for acknowledgement signals is differentiated from that used for prioritizing signals by insuring that the two different types of signals have different time durations. In the exemplary embodiment, the acknowledgement signal tone burst is caused to have a substantially shorter time duration than a prioritizing signal tone burst. In particular, the duration of the acknowledgement signal is less than the time duration required for successful detection of a prioritizing signal by the repeater's prioritizing circuits. In the exemplary embodiment, 50 ms is an acceptable short time duration for the acknowledgement signal tone burst which is nevertheless still sufficiently long to provide a distinct audible acknowledgement signal to the operator of the portable transceiver.

These as well as other objects and advantages of this invention will be better understood by carefully reading the following detailed description of the presently preferred exemplary embodiment of this invention taken in conjunction with the accompanying drawings, of which.

Figures 1, 2:
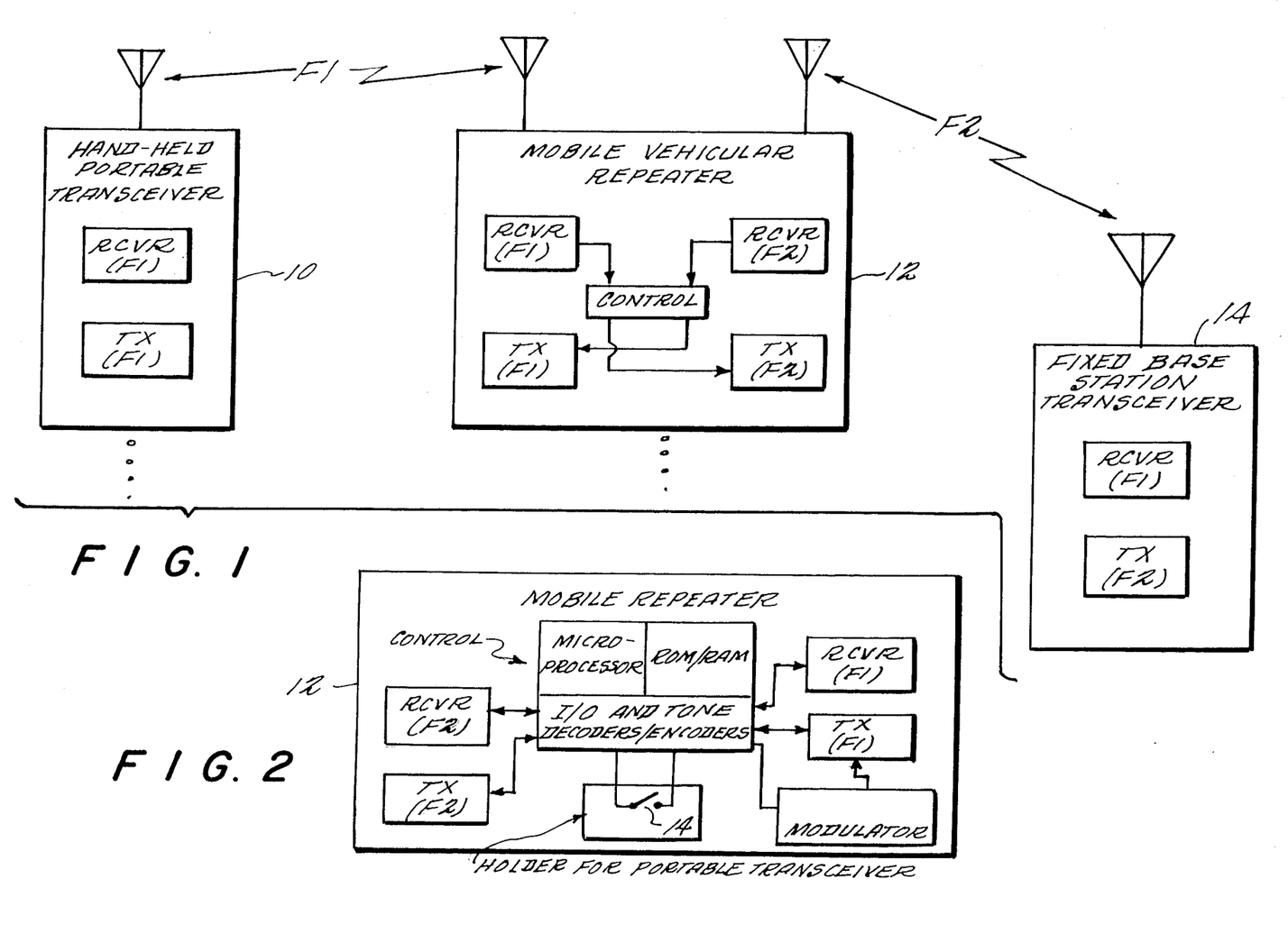
FIG. 1 is a schematic depiction of a portable transceiver/mobile vehicular repeater/fixed base station transceiver system of this invention.
FIG. 2 is a slightly more detailed schematic depiction of the mobile vehicular repeater of this invention as utilized in the embodiment of FIG. 1.

In the system depicted at FIG. 1, there are typically plural hand held portable transceivers 10 in communication via frequency channel F1 with plural mobile vehicular repeaters 12. One such vehicular repeater will typically be placed in a "priority" status and utilized to repeat information from transceiver 10 to a predetermined fixed base station transceiver 14 via a second frequency channel F2. Typically, each transceiver 10 will include both a receiver and transmitter capable of operating on frequency F1 while the vehicular repeaters each include a pair of transceivers interconnected via control circuits such that information received and detected via receiver F1 may be, if appropriate, re-transmitted via transmitter F2 while information received via receiver F2 may, if appropriate, be re-transmitted via transmitter F1. The fixed base station transceiver 14 typically includes both a receiver and transmitter capable of operating at the second frequency F2.

As depicted in FIG. 2, a portable presence detecting switch 14 is preferably provided with each vehicular repeater 12. When an officer is located in the repeater equipped vehicle, his/her portable transceiver 10 is physically associated with the repeater (e.g. placed in a slot or the like) so as to cause switch 14 to assume a predetermined first state (e.g. "closed"). On the other hand, when the officer removes the portable unit from its usual resting place on the repeater, switch 14 assumes a predetermined second state (e.g. "open"). Control circuits in the repeater 12 monitor the state of switch 14 and when a change from the first to the second state is detected, that particular repeater takes two actions: (a) it assumes an active repeater or "priority" status, and (b) it transmits a burst of F1 carrier modulated with a tone T1 which is intended as a prioritizing signal to any other vehicular repeaters that appear to be within range (which other repeaters will, in response to such signal be reset to an inactive "non-priority" status if not already in that status). As will be appreciated sensing techniques other than switch 14 may also be used to control the transmission of prioritizing signals.

In the preferred exemplary embodiment, the mobile repeater comprises control circuits based on a conventional microprocessor or other type of conventional digital data processor connected to conventional memory circuits (e.g. ROM and/or RAM) and capable of receiving and issuing command/information signals via I/O circuits so as to control the operation of the receivers, transmitters, tone modulators, etc. within the repeater. Since the hardware components and architecture of the hardware circuitry depicted in FIGS. 1 and 2 may be of conventional design insofar as practice of this particular invention is concerned, no further detail need be here included.

In the presently preferred exemplary embodiment, the desired acknowledgement signal is generated and distinguished from similar tone T1 modulated prioritizing signals by relatively simple changes to the controlling program stored in the ROM/RAM associated with the microprocessor of the mobile repeater control circuits. As will be appreciated by those in the art, similar hard-wired control circuitry could alternatively be employed in whole or in part to achieve the same or equivalent end results.

Figure 5:
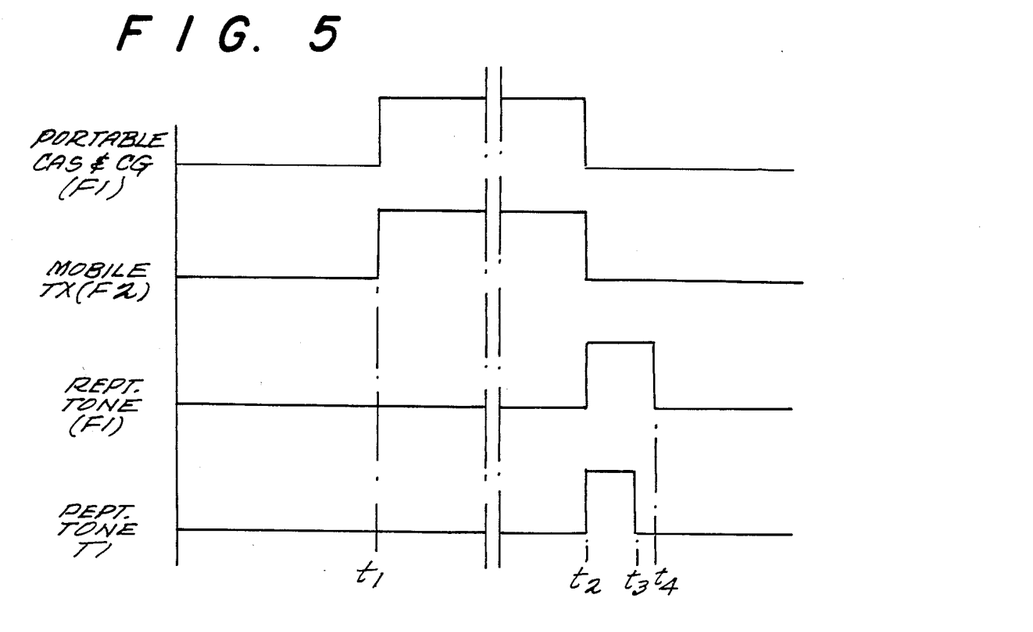
FIG. 5 is a signal timing diagram useful in explaining the operation of the repeater shown in FIG. 2 in conjunction with the flow chart of FIG. 3.

Typically, the mobile repeater 12 (when in a "priority" state) is adapted to begin transmitting at time $t_1$ shown in FIG. 5 when it detects both a carrier activity signal (CAS) and a channel guard tone (CG) on the portable transceiver operating carrier frequency F1. Once the priority repeater has entered such a portable-to-base repeating mode (as depicted at 20 in FIG. 3), it will enter a loop which includes repeated test steps 22, 24 for the carrier activity and channel guard signals on frequency F1. Whenever those signals disappear (e.g. at the conclusion of a transmission by the portable which is intended to be repeated by the base station), the control program, at block 26, enables the repeater transmitter on frequency F1 (i.e. the up-link back to the originating portable station) and the tone T1 modulator at time $t_2$. Thereafter, a 50 ms wait loop is entered at 28 after which, at block 30 in FIG. 3, the tone modulator is disabled at time $t_3$. A relatively short 10 ms wait loop is then entered at 32 before the repeater transmitter on frequency F1 is disabled at block 34 at time $t_4$ and the program segment is then exited. The slightly staggered turn off of the T1 tone modulator and F1 carrier is preferred so as to make the audible tone to the operator of the portable transceiver more distinctly heard.

Figure 3:
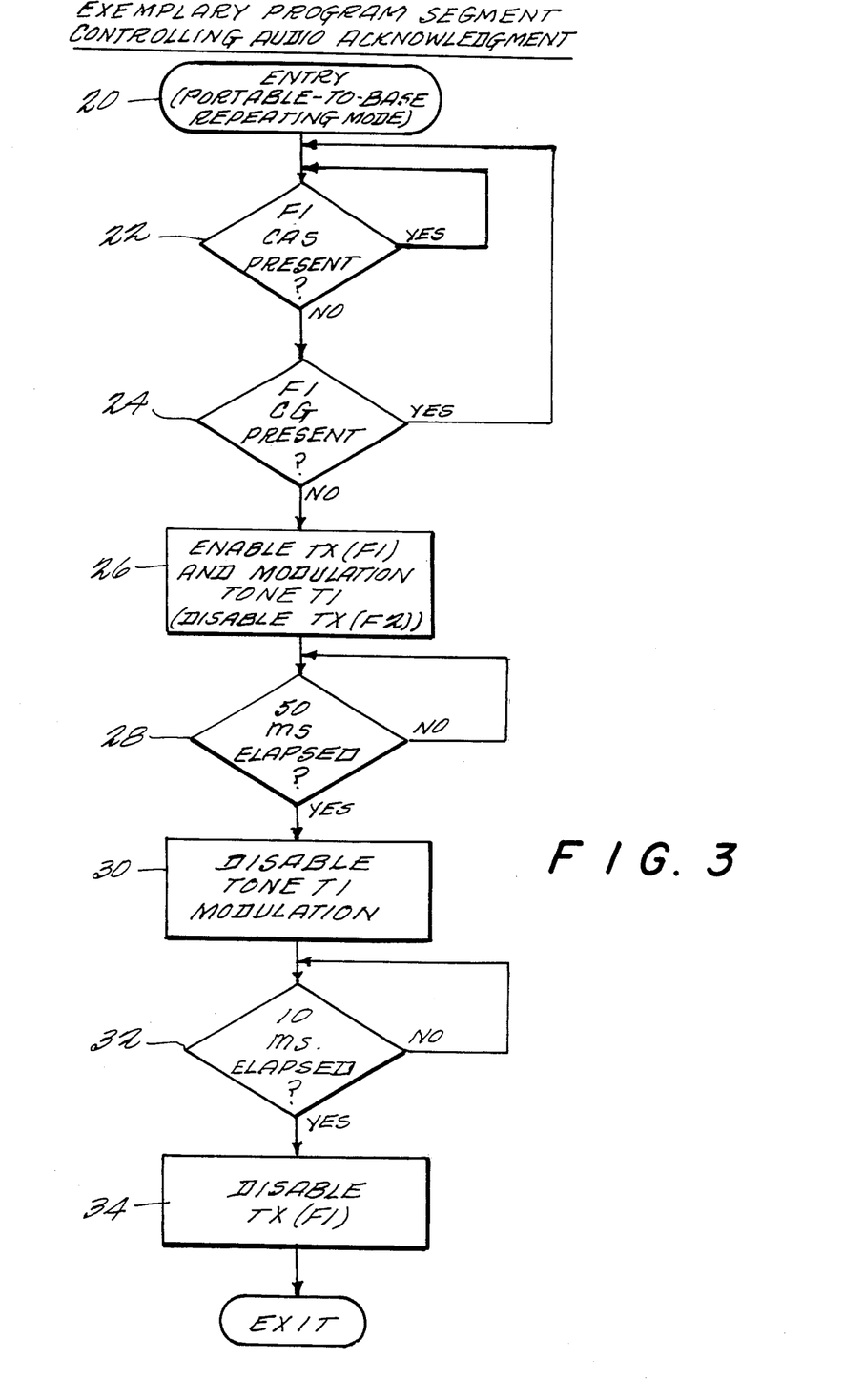
FIG. 3 is an exemplary flow chart of a program segment that may be utilized for controlling the generation of audio frequency acknowledgement signals in the repeater of FIG. 2.

Of course, as indicated at block 26 of FIG. 3, the repeater transmitter on frequency F2 can be disabled at the same time the F1 transmitter and tone modulator are enabled.

Accordingly, by including a program segment like that shown in FIG. 3 in the control program for the microprocessor of the repeater 12, a short 50 ms acknowledgment signal will be generated on the up-link frequency F1 to provide a positive signal to the operator of the portable transceiver indicating that, at least as of the end of his attempted transmission, he had successfully been in communication with a vehicular repeater.

This type of acknowledgement signal is believed to be most useful in public services and emergency services vehicular radio repeater systems where it is important for hand held portable transceiver units to maintain radio contact via a mobile vehicular repeater. Even in other less critical situations, such an acknowledgement signal will help eliminate questions at the originating radio site as to whether the radio link is still operating reliably and correctly.

Where several such vehicular repeaters and portable transceivers are present in a common area, such an acknowledgement signal also helps indicate to other portable transceivers whether the last transmission was intended to be repeated to the base or whether it was, instead, intended only for the other portable transceivers in the area. In the latter instance, no channel guard tone would have been transmitted and, accordingly, no repeating operation would have been performed. Accordingly, when the transmitting portable transceiver terminates its transmission, there will be no acknowledgement signal generated by any repeater and this may be taken as a signal to other portable units within range that no repeating operation was requested by the originating portable station. On the other hand, if the acknowledgement signal is detected by the other portable units, then they will immediately all be in possession of the fact that such repeating operation was requested and that it was successfully communicated to a repeater. Such added information can be of vital importance to a network of portable transceiver users commonly involved in a life-endangering situation.

Figure 6:
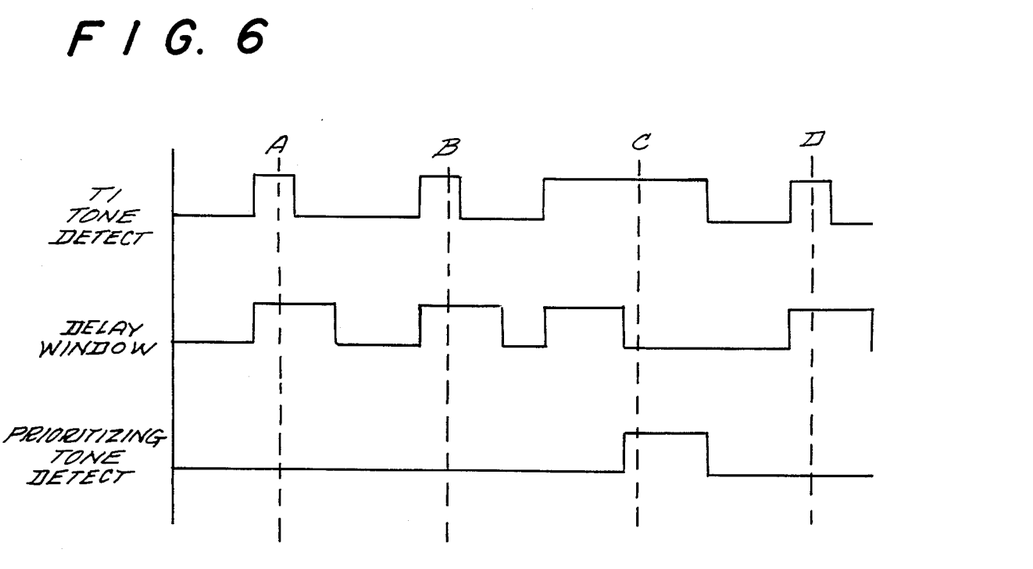
FIG. 6 is a signal timing diagram useful in explaining the operation of the repeater shown in FIG. 2 in conjunction with the flow chart of FIG. 4.

To prevent the brief 50 ms acknowledgement signal from inadvertently tripping the prioritizing circuits of the repeater (if a transmitted toneprioritizing scheme is employed), steps should be taken to insure that the prioritizing circuits do not respond to T1 tone bursts of 50 ms or less. Thus, as depicted in FIG. 6, when the T1 tone detector of a repeater F1 receiver becomes active as indicated at A, B, C or D, it should be required to persist longer than some delay window greater than 50 ms (or whatever duration acknowledgement signal is utilized) before a "prioritizing" tone detection occurs. For example, as depicted in FIG. 3, only situation C where the T1 tone detector output has persisted for a time longer than the delay window is a prioritizing tone detector output provided.

Figure 4:
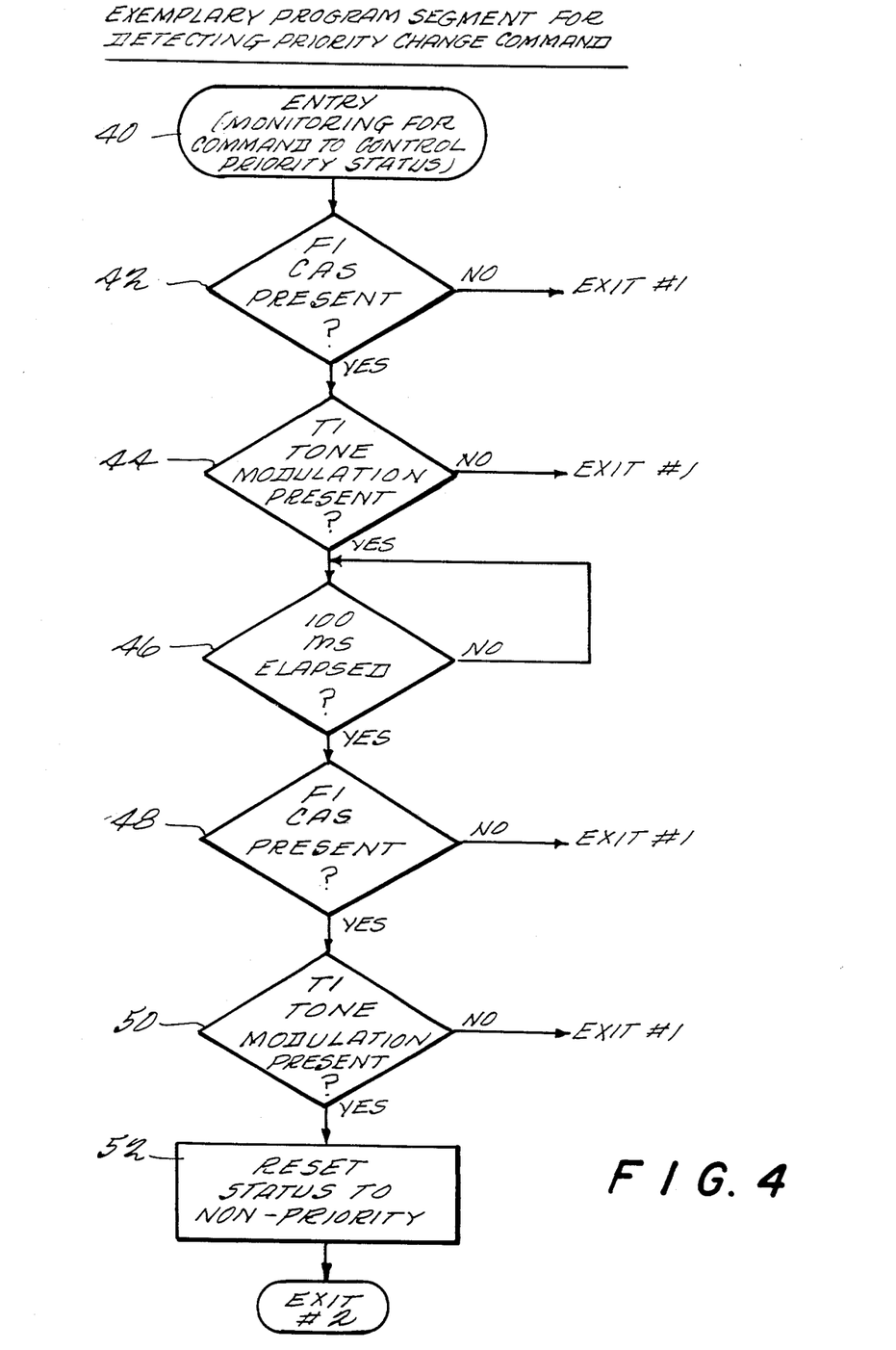
FIG. 4 is an exemplary flow chart of a program segment that may be used for detecting similar tone modulated priority change command signals of different time duration by the repeater of FIG. 2.

One exemplary program segment for thus properly detecting prioritizing T1 tone bursts is depicted at FIG. 4. Here, at block 40, it is assumed that the microprocessor of the repeater 12 is in a phase of its operation where prioritizing commands are being monitored (e.g. whenever the repeater is in a non-priority or priority but not repeating status). Here, unless carrier activity signal CAS is detected at 42 and T1 tone modulation is detected at 44, this program segment will be exited (or looped back on itself as may be appropriate). However, if both F1 carrier activity signal CAS and T1 tone modulation thereon are detected, then a 100 ms wait loop is entered at 46. Thereafter, another test for F1 carrier activity signal is made at 48 followed by a test for T1 tone modulation at 50. If both F1 carrier and T1 tone thereon are still present, then the priority state will be reset at 52 to a "non-priority" status (or some other appropriate prioritizing function will be taken as appropriate to the type of repeater system being utilized)

before a normal exit from this program segment is taken.

Of course, depending upon the repeater design, it may already require some relatively long duration tone burst before prioritizing actions are taken. If so, it may not be necessary to provide any additional protection against relatively shorter duration acknowledgement signal tone bursts using the same audio frequency.

Accordingly, as should now be appreciated, the exemplary embodiment of this invention provides method and apparatus for transmitting an acknowledgement signal (e.g. an audio frequency tone or the like) on the repeater up-link to the originating portable transceiver upon the end of a transmission which was intended to be repeated. This permits the originating transceiver operator to verify that his transmission was indeed received and, in all probability, repeated. The exemplary method and apparatus also prevents the desired acknowledgement signal from interfering with the prioritizing schemes of existing vehicular repeater systems.

Figure 7:
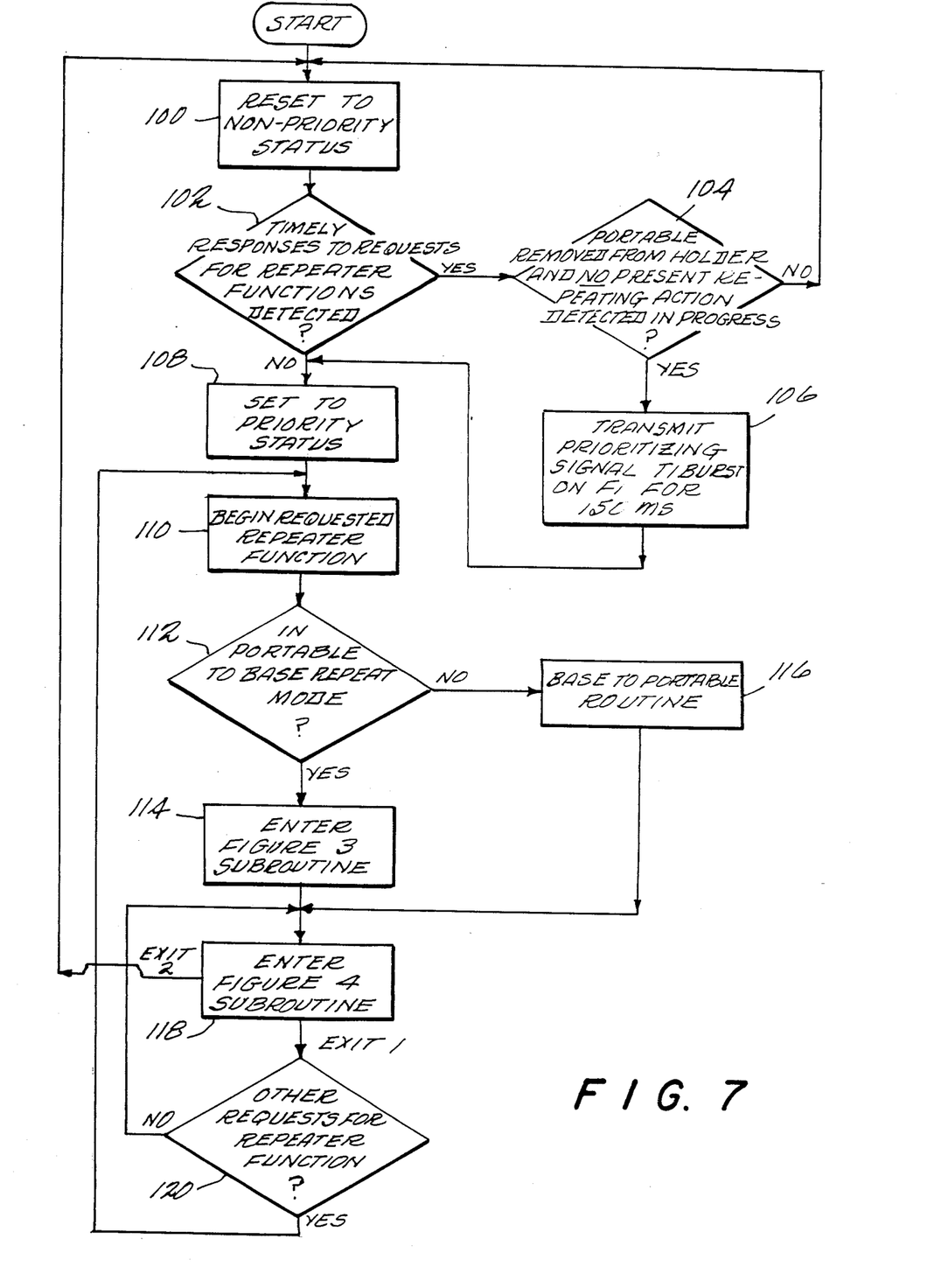
FIG. 7 is a general flow chart useful in explaining the overall method of operation for the preferred exemplary embodiment of FIG. 1.

The simplified flow chart of FIG. 7 is presented purely for the purpose of helping the reader to understand the overall use of this invention in a system of vehicular repeaters having the preferred prioritizing scheme earlier described. It is not intended to necessarily depict all the details or the specific organization of any particular actual program for the microprocessor of the mobile repeater—although it might, if desired, be used to develop such a program.

After being turned on (and perhaps after other initializing or "housekeeping" functions are performed, a given vehicular repeater may be reset to a "non-priority" status at block 100 in FIG. 7. While in that status, the timeliness of responses of other repeaters to requested repeating functions is monitored at 102. So long as timely responses are detected, the repeater stays in a non-priority loop including a check on the status of the portable presence sensing switch 14 at block 104. If the portable is detected as being removed from its holder and no other repeater activity is concurrently detected at 104, then 700 ms burst of T1 tone on F1 frequency channel is transmitted at block 106 to reset any other "priority" repeater within range to a "non-priority" status (e.g. via the FIG. 4 subroutine).

Thereafter (and/or in the event timely repeater responses are not detected at 102), the repeater is set to "priority" status at 108 and the requested repeater function is begun at 110. If a portable-to-base repeater function is detected at 112, then the FIG. 3 subroutine (which includes generation of a 50 ms acknowledgement signal at the end of the received F1 with CG signal to be repeated) is entered at 114. Otherwise, the appropriate base-to-portable repeating function is entered at 116. Once the proper repeating function is concluded, the FIG. 4 subroutine may be entered at 118. If normal exit number one is taken, then a test is made at 120 for other repeater function requests—and the blocks 118, 120 are then looped through until:

a a repeater request is detected at 120 and is responded at at 110 starting another cycle of repeater operation; or b an exit number 2 is taken from the FIG. 4 subroutine whereupon control is passed back to block 100 where the repeater is reset to a "non-priority" status.

While only one exemplary embodiment of this invention has been described in detail above, those skilled in the art will recognize that many variations and modifications may be made in this exemplary embodiment while still retaining many of the novel advantages and features of this invention. Accordingly, all such variations and modifications are intended to be included within the scope of the following claims.

What is claimed is:

1. In a radio repeater system of (a) at least one portable transceiver transceiving on frequency channel F1, (b) at least one mobile repeater which transceives on frequency channels F1 and F2 so as to provide automatic radio repeater services between the portable transceiver, and (c) another base transceiver operating on frequency channel F2, an improved mobile repeater comprising:

a radio receiver means capable of operating on frequency channel F1 to receive information thereover transmitted from a portable transceiver;

a first radio transitter means capable of operating on frequency channel F2 to automatically and substantially simultaneously re-transmit said information verbatim;

a second radio transmitter means capable of operating on frequency channel F1; and control means connected to said radio receiver means and to said first and second radio transmitter means for detecting the termination of a received portable transceiver transmission on frequency F1 which is to be automatically and substantially simultaneously repeated verbatim on frequency F2 and, in response to such detected termination to activate said second radio transmitter means and to automatically send an up-link acknowledgement signal back to the portable tranceiver on the same channel F1 so as to give the operator of the portable transceiver a positive indication that the just concluded portable transceiver transmission on frequency F1 was at least successfully received by the repeater.

2. An improved radio repeater system as in claim 1 wherein the control means of said mobile repeater includes means for causing modulation of its F1 channel transmissions with a predetermined audio frequency T1 tone which persists for only a predetermined time increment and which serves as said acknowledgement signal.

3. In a radio repeater system of at least one portable transceiver transceiving on frequency channel F1 and at least one mobile repeater which transceives on frequency channels F1 and F2 so as to provide radio repeater services between the portable transceiver and another transceiver operating on frequency channel F2, an improved mobile repeater comprising:

a radio receiver means capable of operating on frequency channel F1 to receive information thereover transmitted from a portable transceiver;

a first radio transmitter means capable of operating on frequency channel F2 to re-transmit said information;

a second radio transmitter means capable of operating on frequency channel F1; and control means connected to said radio receiver means and to said first and second radio transmitter means for detecting the termination of a received portable transceiver transmission to be repeated and, in response to such detected termination, to activate said second radio transmitter means to send an acknowledgement signal to the portable transceiver on channel F1 so as to give the operator of the portable transceiver a positive indication that the just concluded transmission was successfully received by the repeater;

wherein the control means of said mobile repeater includes means for causing modulation of its F1 channel transmissions with a predetermined audio frequency T1 tone which persists for only a predetermined time increment and which serves as said acknowledgement signal; and wherein said predetermined time increment is less than the duration of similarly T1 tone modulated F1 transmissions to be utilized by mobile repeaters in the system for determining their relative priority status.

4. An improved radio repeater system as in claim 3 wherein said mobile repeater is normally physically associated with at least one portable transceiver and includes:

means for detecting when that portable transceiver is removed therefrom for portable operation and which, in response to such detection and to the absence of other ongoing repeater activity on F1 or F2, causes a T1 tone modulated F1 transmission therefrom for a time duration substantially longer than said predetermined time increment and the assumption of a "priority" active repeater status by such transmitting repeater; and means for receiving and detecting such a longer duration T1 tone modulated F1 transmission (i.e. from another repeater) and, in response thereto, for resetting such receiving repeater to an inactive "non-priority" status.

5. A mobile vehicular radio repeater comprising:

a first radio receiver means capable of operation on channel F1;

a second radio receiver means capable of operation on channel F2;

a first radio transmitter means capable of automatically re-transmitting verbatim on channel F1 information received on channel F2 via said second radio receiver means;

a second radio transmitter means capable of automatically and substantially simultaneously re-transmitting verbatim on channel F2 information received on channel F1 via said first radio receiver means; and control means connected to said first and second radio receiver means and to said first and second radio transmitter means for controlling said re-transmitting functions and also adapted to detect the termination of a radio transmission received via said first radio receiver means on channel F1 to be automatically repeated and, in response to such detected termination, to automatically activate said first radio transmitter means for a predetermined time increment to send an acknowledgement signal on channel F1 signifying successful receipt of a transmission on channel F1 to be automatically and substantially simultaneously repeated on channel F2.

6. A mobile vehicular radio repeater as in claim 5 wherein said control means includes means for causing modulation of the F1 channel transmissions with a predetermined audio frequency T1 tone during at least a predetermined portion of said predetermined time increment.

7. A mobile vehicular radio repeater comprising:

a first radio receiver means capable of operation on channel F1;

a second radio receiver means capable of operation on channel F2;

a first radio transmitter means capable of retransmitting on channel F1 information received via said second radio receiver means;

a second radio transmitter means capable of retransmitting on channel F2 information received via said first radio receiver means; and control means connected to said first and second radio receiver means and to said first and second radio transmitter means for controlling said re-transmitting functions and also adapted to detect the termination of a radio transmission received via said first radio receiver means on channel F1 to be repeated and, in response to such detected termination, to activate said first radio transmitter means for a predetermined time increment to send an acknowledgement signal on channel F1 signifying successful conclusion of received transmission from channel F1 to be repeated on channel F2;

wherein said control means includes means for causing modulation of the F1 channel transmissions with a predetermined audio frequency T1 tone during at least a predetermined portion of said predetermined time increment; and wherein said predetermined portion of said predetermined time increment is less than the expected duration of similarly T1 tone modulated F1 channel transmissions to be utilized by the repeater for determining its priority status.

8. A mobile vehicular radio repeater comprising:

a first radio receiver means capable of operation on channel F1;

a second radio receiver means capable of operation on channel F2;

a first radio transmitter means capable of retransmitting on channel F1 information received via said second radio receiver means;

a second radio transmitter means capable of retransmitting on channel F2 information received via said first radio receiver means; and control means connected to said first and second radio receiver means and to said first and second radio transmitter means for controlling said re-transmitting functions and also adapted to detect the termination of a radio transmission received via said first radio receiver means on channel F1 to be repeated and, in response to such detected termination, to activate said first radio transmitter means for a predetermined time increment to send an acknowledgement signal on channel F1 signifying successful conclusion of received transmission from channel F1 to be repeated on channel F2;

wherein said control means includes means for causing modulation of the F1 channel transmissions with a predetermined audio frequency T1 tone during at least a predetermined portion of said predetermined time increment; and means for detecting when a portable F1 channel transceiver is physically disassociated from said repeater and which, in response to such detection and to the also detected absence of other ongoing repeater activity on F1 or F2 channels, (a) causes said repeater to issue a T1 tone modulated transmission for a time duration substantially longer than said predetermined portion and (b) causes such transmitting repeater to thereafter assume an active "priority" repeater status; and means for receiving and detecting such a longer duration T1 tone modulated F1 transmission and, in response thereto, resetting such receiving repeater to an inactive "non-priority" status.

9. A method of operating a radio repeater system of (a) at least one portable transceiver transceiving on frequency channel F1, (b) at least one mobile repeater which transceives on frequency channels F1 and F2 so as to provide automatic radio repeater services between the portable transceiver, and (c) another base transceiver operating on frequency channel F2, said method comprising the steps of:

receiving a mobile repeater information transmitting on frequency channel F1 from a portable tranceiver;

automatically and substantially simultaneously re-transmitting verbatim from said mobile repeater said information on frequency channel F2; and detecting the termination of said received portable transceiver transmission on frequency F1 which is to be automatically repeated verbatim on frequency F2 and, in response to such detected termination, automatically sending an up-link acknowledgement signal to the portable transceiver on channel F1 signifying the successfully concluded receipt of the portable F1 transmission to be automatically repeated so as to give the operator of the portable transceiver a positive indication that the just concluded transmission was successfully received.

10. A method as in claim 9 including the step of modulating said F1 channel transmission of the repeater with a predetermined audio frequency T1 tone which persists for only a predetermined time increment and which serves as said acknowledgement signal.

11. A method of operating a radio repeater system of at least one portable transceiver transceiving on frequency channel F1 and at least one mobile repeater which transceives on frequency channels F1 and F2 so as to provide radio repeater services between the portable transceiver and another transceiver operating on frequency channel F2, said method comprising the steps of:

receiving at a mobile repeater information transmitted on frequency channel F1 from a portable transceiver;

re-transmitting from said mobile repeater said information on frequency channel F2;

detecting the termination of said received portable transceiver transmission to be repeated and, in response to such detected termination, sending an acknowledgement signal to the portable transceiver on channel F1 signifying the successfully concluded receipt of the portable F1 transmission to be repeated so as to give the operator of the portable transceiver a positive indication that the just concluded transmission was successfully received; and modulating said F1 channel transmission of the repeater with a predetermined audio frequency T1 tone which persists for only a predetermined time increment and which serves as said acknowledgement signal;

wherein said predetermined time increment is less than the duration of similarly T1 tone modulated F1 transmissions to be utilized by mobile repeaters in the system for determining their relative priority status.

12. A method of operating a radio repeater system of at least one portable transceiver transceiving on frequency channel F1 and at least one mobile repeater which transceives on frequency channels F1 and F2 so as to provide radio repeater services between the portable transceiver and another transceiver operating on frequency channel F2, said method comprising the steps of:

receiving at a mobile repeater information transmitted on frequency channel F1 from a portable transceiver;

re-transmitting from said mobile repeater said information on frequency channel F2;

detecting the termination of said received portable transceiver transmission to be repeated and, in response to such detected termination, sending an acknowledgement signal to the portable transceiver on channel F1 signifying the successfully concluded receipt of the portable F1 transmission to be repeated so as to give the operator of the portable transceiver a positive indication that the just concluded transmission was successfully received;

modulating said F1 channel transmission of the repeater with a predetermined audio frequency T1 tone which persists for only a predetermined time increment and which serves as said acknowledgement signal;

detecting when a portable F1 channel transceiver is physically disassociated from a given repeater and, in response to such detection and to the also detected absence of other ongoing repeater activity on F1 or F2 channels, (a) issuing from such repeater a T1 tone modulated transmission for a time duration substantially longer than said predetermined time increment and (b) causing such transmitting repeater to thereafter assume an active "priority" repeater status; and receiving and detecting such a longer duration T1 tone modulated F1 channel transmission and, in response thereto, resetting such receiving repeater to an inactive "non-priority" status.

13. A vehicular repeater adapted for use in a communication system of plural such vehicular repeaters within range of plural portable transceivers, said vehicular repeater comprising:

an F1 channel transceiver for communication with said portable transceivers;

an F2 channel transceiver for communication with a base transceiver;

holder means for removably associating a portable transceiver and for providing a sensible indication of the removal of such portable transceiver therefrom; and control means connected to said F1 channel transceiver, to said F2 channel transceiver and to said holder means for:

a detecting said removal of the portable transceiver in the absence of other repeating activity and, in response thereto, causing the transmission of a T1 tone modulated F1 channel signal for a first predetermined length of time and the assumption of an active "priority" repeater status;

b while in an active "priority" repeater status, repeating on F2 channel information received on F1 channel concurrently with a CG tone modulated F1 channel signal, thereon, detecting the termination of received CG tone modulated F1 channel signals and, in response to such detected termination causing the transmission of a T1 tone modulated F1 channel acknowledgement for a second predetermined length of time less than said first predetermined length of time; and c while in an active "priority" repeater status, receiving and detecting a T1 tone modulated F1 channel signal which persists for said first predetermined length of time and, in response thereto, causing said repeater to assume an inactive "non-priority" repeater status.

14. A vehicular repeater as in claim 13 wherein said control means further includes, while in an inactive "non-priority" status, means for monitoring the timeliness of other repeater responses to requests for repeating activity and, in the absence of such timely responses, causes the assumption of an active "priority" repeater status.

* * * * *